Dec. 21, 1965    C. R. STEWART    3,224,381
WHEEL FOR CARRYING ELECTRONIC EQUIPMENT
Filed March 30, 1964    2 Sheets-Sheet 1

INVENTOR.
CLYDE R. STEWART
BY
Christie, Parker & Hale
ATTORNEYS.

INVENTOR.
CLYDE R. STEWART
BY
ATTORNEYS.

United States Patent Office 3,224,381
Patented Dec. 21, 1965

3,224,381
WHEEL FOR CARRYING ELECTRONIC
EQUIPMENT
Clyde R. Stewart, Palo Alto, Calif., assignor, by mesne assignments, to Hewlett-Packard Company, Palo Alto, Calif., a corporation of California
Filed Mar. 30, 1964, Ser. No. 355,709
5 Claims. (Cl. 105—150)

This invention relates to an improved wheel for carrying electronic equipment with a minimum amount of vibration.

Copending application Serial No. 330,820 filed December 16, 1963, assigned to the same assignee, discloses and claims apparatus for locating leaks which generate ultrasonic vibrations. The apparatus is mounted on a carriage or frame which has wheels that roll along an elongated member to be checked for leaks. The invention is ideally suited for locating leaks in pressurized telephone cables. A leak is detected by an ultrasonic transducer mounted on the carriage. The equipment has worked satisfactorily, but its efficient operation is sometimes prevented by unwanted ultrasonic noises generated by the wheels of the carriage rolling along the member under test.

This invention provides an improved wheel and mounting assembly so that a minimum amount of ultrasonic noise is generated as the carriage is rolled along the member under test.

The wheel includes a generally circular body which has an annular groove to receive the member on which the wheel rolls. The wheel is preferably made of a plastic material which produces a minimum amount of ultrasonic noise as it rolls along the member. I have found polyethylene, sold under the trademark "Tenite," is ideally suited for this purpose.

Preferably, the central portion of the groove has a higher coefficient of friction against the member than does the outer portion of the groove. The groove also increases in width with distance from the axis of rotation of the wheel. Preferably, the width of the groove increases at a greater rate nearer the axis of rotation than at a point more distant from the axis of rotation. These features tend to cause the groove to center the wheel on the member on which it rolls. The increased coefficient of friction in the central part of the wheel minimizes slipping between the wheel and the member when the member is properly centered, and thereby avoids unnecessary ultrasonic noise. The more slippery part of the outer portion of the groove causes the wheel to slide and center the member on the center part of the groove having the higher coefficient of friction. The decreasing rate of increased groove width with the distance from the axis of rotation facilitates maneuvering the wheel on the elongated member when the member is high in the air, such as on a pressurized telephone cable, and the carriage is pushed or pulled along by a pole pivotally connected at its upper end to the carriage. Preferably, the increased coefficient of friction of the groove in its central portion is obtained by a rubber band fitted around the central part of the groove.

Conveniently, the wheel is made up of two opposed plastic flanges secured to a plastic hub. An axle extends through the hub and is adapted to be mounted to a frame through vibration isolation bushings which further minimizes the ultrasonic noise generated by the wheel when it rolls on the member under test.

These and other aspects of the invention will be more fully understood by the following detailed description and the accompanying drawings, in which.

Figure 1:
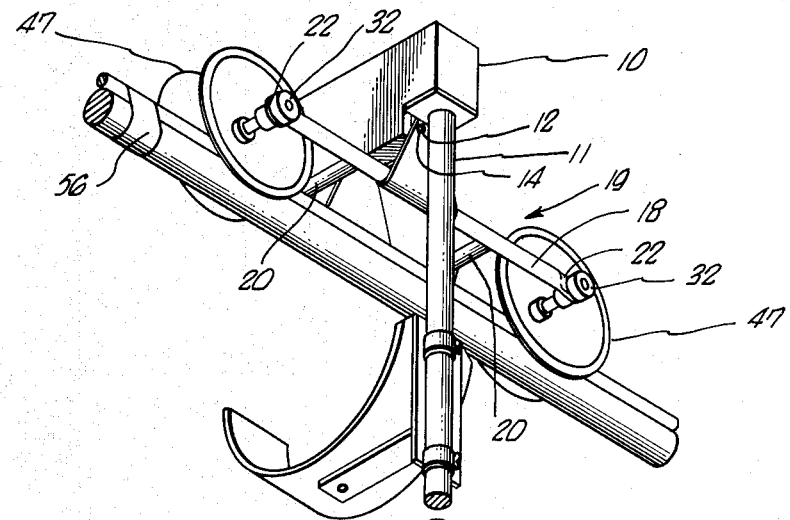
FIG. 1 is a perspective view of the improved wheel mounted on a carriage.

Referring to FIG. 1, a housing 10 is secured to the upper end of an elongated vertical hollow pole 11 made of suitable insulating material, such as fiberglass. A pair of horizontal pivot pins 12 on opposite sides of the housing 10 each fit through a respective nylon bushing 14 disposed in an opening 15 in the upper end of a respective bridge hanger 16 welded at its lower end to a respective elongated side rod 18 of a frame or carriage 19. The side rods are connected together by cross rods 20 welded at their ends to the side rods. Preferably, the side rods and cross rods are made of light weight aluminum alloy tubing for maximum strength and minimum weight.

Each end of each side rod includes a flattened portion 22 with a transverse hole 23 through which is disposed a separate respective vibration isolation bushing or grommet 24. Each grommet includes an inner cylindrical portion 26 which makes a close fit around a respective outer end of an axle 28 secured between adjacent ends of the side rods by screws 30 threaded into the ends of the axle. Each bushing includes a flared head 32 which fits on the outside of each respective end of a side rod to receive a respective screw. Thus, the axle is completely isolated from the side rods and carriage by the isolation grommets.

Each axle makes a close sliding fit through a central bore 34 in a respective hub 36 which preferably is made of a plastic such as nylon. Spring clip retaining rings 38 fit in respective annular grooves 40 (FIG. 2) in the axle at each end of each hub and bear against respective nylon washers 42 to prevent each hub from sliding longitudinally along its axle.

A pair of opposed wheel flanges 44 are secured by screws 45 and nuts 46 to the outer periphery and opposite sides of each hub to form a wheel 47 at each end of the frame. Each wheel flange includes an annular first section 48 which is secured against an outwardly extending flange on the hub. First sections 48 are perpendicular to the longitudinal axis of the axle. A second or intermediate conical section 50 of each wheel flange is formed integrally at its inner or smaller end with the first section 48 at an angle of about 45° to the longitudinal axis of the wheel axle. A third or outer conical section 51 of each wheel flange is formed integrally at its inner end with the intermediate section 50 and extends at an angle of about 75° to the longitudinal axis of the axle. An annular strip 51' of rubber makes a tight fit around each respective hub and overlies the inner edges of adjacent intermediate sections of each pair of wheel flanges. Thus, each pair of wheel flanges define an annular groove 52 which receives an elongated member such as a pressurized telephone conduit 54 secured by a lashing strand 56 to a steel cable messenger 58 which is supported between adjacent telephone poles (not shown). Radial webs 59 formed integrally with the exterior surface of each wheel flange provide increased rigidity with minimum weight.

Figure 4:
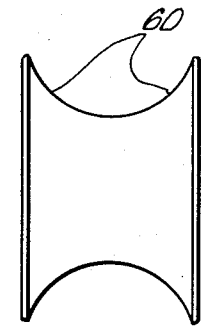
FIG. 4 is a schematic view of an alternate shape of the wheel.

The arrangement of the wheel flanges is such that the width of the groove (as viewed in cross section) increases at a decreasing rate with distance from the axle. This configuration is advantageous in keeping the wheel on the cable when the frame or carriage must be tilted, say, by the operator having to walk around an obstacle on the ground below the conduit. Instead of having the wheel flanges made with adjoining conical sections, they can be in the shape of smooth concave curves 60, as shown schematically in FIG. 4.

Figure 3:
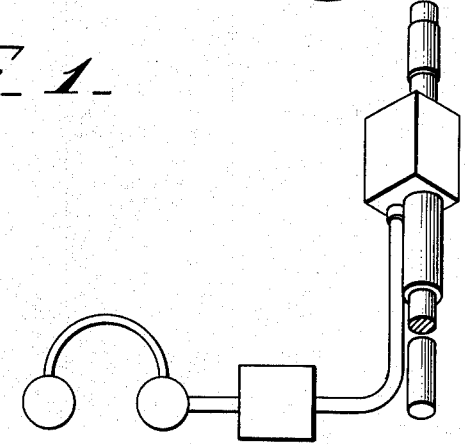
FIG. 3 is a view taken on line 3—3 of FIG. 2.
Figure 3:
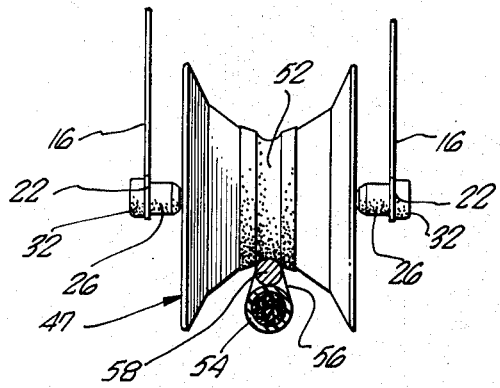
Figure 2:
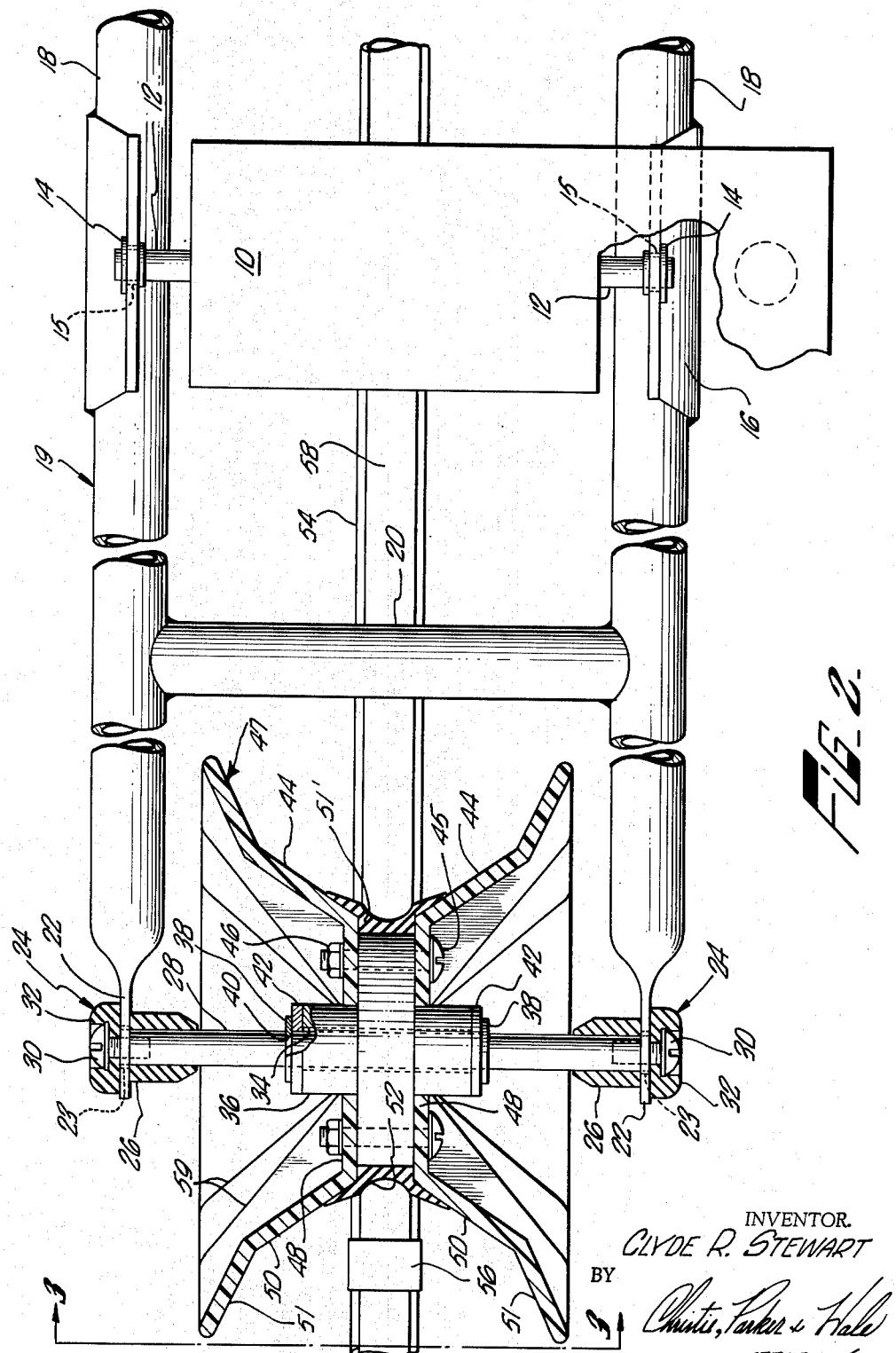
FIG. 2 is a fragmentary plan view, partly in section, of the improved wheel.

In using the apparatus shown in FIGS. 1 through 3, the wheels are placed as shown on the telephone cable messenger 58 so the messenger fits against the concave surface of the annular rubber strip. The apparatus is pulled or pushed along the messenger with the pole, and the ultrasonic transducer in the housing listens for ultrasonic vibrations produced by any leak which may be present in the cable.

As the wheel rolls, it is prevented from slipping because of the high coefficient of friction between the annular rubber strip and the steel messenger. If it is necessary for an operator to walk out around an obstacle on the ground, say, a parked car, the unit is rotated about 45° about a horizontal axis, but the curvature of the groove between the wheel flanges prevents the unit from slipping off the cable. Moreover, the nature of the polyethylene plastic used in the wheel flanges produces a minimum amount of ultrasonic noise during this operation. In this respect, the polyethylene plastic has been found to be superior to any other plastic to date.

After the operator moves past the obstacle, he moves back under the cable and the wheel slides until the messenger is again centered on the rubber band. As the polyethylene portion of the wheel flange slides along the messenger, there is some scraping, but the amount of ultrasonic noise generated is a minimum because of the nature of the polyethylene plastic. Moreover, any ultrasonic noises which may be generated by the wheel are damped and almost totally absorbed by the isolating bushing at the end of each axle, so that little, if any, ultrasonic noise is transmitted from the wheel to the frame and to the ultrasonic transducer in the housing.

I claim:

1. A wheel adapted to roll on an elongated member, the wheel including a plastic hub, a first annular plastic wheel flange secured to one side of the hub, a second annular plastic wheel flange secured to the opposite side of the hub so the flanges are spaced apart, the flanges extending away from each other at a rate decreasing with distance from the hub axis to form an annular groove around the hub to receive the member, and an annular strip disposed around the central portion of the groove, the strip having a higher coefficient of friction against the member than does the outer portion of the groove.

2. A wheel adapted to roll on an elongated member, the wheel including a nylon hub, a first annular polyethylene wheel flange secured to one side of the hub, a second annular polyethylene wheel flange secured to the opposite side of the hub so the flanges are spaced apart, the flanges extending away from each other at a rate decreasing with distance from the hub axis to form an annular groove around the hub to receive the member, and an annular strip disposed around the central portion of the groove, the strip having a higher coefficient of friction against the member than does the outer portion of the groove.

3. A wheel adapted to roll on an elongated member, the wheel including a hub, a first annular plastic wheel flange secured to one side of the hub, a second annular plastic wheel flange secured to the opposite side of the hub so the flanges are spaced apart, the flanges extending away from each other at a rate decreasing with distance from the hub axis to form an annular groove around the hub to receive the member, a plurality of radial stiffening webs secured to the outer surface of each respective wheel flange, and an annular strip disposed around the central portion of the groove, the strip having a higher coefficient of friction against the member than does the outer portion of the groove.

4. A wheel adapted to roll on an elongated member, the wheel including a plastic hub, a first annular plastic wheel flange secured to one side of the hub, a second annular plastic wheel flange secured to the opposite side of the hub so the flanges are spaced apart, the flanges extending away from each other at a rate decreasing with distance from the hub axis to form an annular groove around the hub to receive the member, an annular strip disposed around the central portion of the groove, the strip having a higher coefficient of friction against the member than does the outer portion of the groove, an axle through the hub, a frame secured to the axle, and a pole secured to the frame.

5. A wheel adapted to roll on an elongated member, the wheel including a plastic hub, a first annular plastic wheel flange secured to one side of the hub, a second annular plastic wheel flange secured to the opposite side of the hub so the flanges are spaced apart, the flanges extending away from each other at a rate decreasing with distance from the hub axis to form an annular groove around the hub to receive the member, an annular strip disposed around the central portion of the groove, the strip having a higher coefficient of friction against the member than does the outer portion of the groove, an axle through the hub, a frame, a resilient body disposed between the axle and the frame, and means for securing together the axle, frame and resilient body.

References Cited by the Examiner

UNITED STATES PATENTS

| | | | |
|---|---|---|---|
| 524,609 | 8/1894 | Prouty. | |
| 1,374,428 | 4/1921 | Chadderdon | 301—53 |
| 1,536,488 | 5/1925 | Fritz | 191—63 X |
| 1,743,100 | 1/1930 | Blackburn | 74—230.7 X |
| 1,780,627 | 11/1930 | Muller | 74—230.7 X |
| 1,874,543 | 8/1932 | Kent | 16—107 |
| 2,218,854 | 10/1940 | Rabelos | 254—190 |
| 2,303,568 | 12/1942 | McWhorter | 280—277 X |
| 2,775,793 | 1/1957 | Cotchett. | |
| 2,848,279 | 9/1958 | Parker | 301—63 |
| 2,991,729 | 7/1961 | Matsui | 301—97 |

FOREIGN PATENTS

| | | |
|---|---|---|
| 247,211 | 2/1963 | Australia. |
| 10,473 | 1911 | Great Britain. |
| 885,675 | 12/1961 | Great Britain. |

BENJAMIN HERSH, *Primary Examiner.*

ARTHUR L. LA POINT, *Examiner.*

R. J. JOHNSON, *Assistant Examiner.*